Nov. 21, 1933.                C. G. SMITH                1,935,894
                       GASEOUS DISCHARGE DEVICE
                        Filed March 25, 1929
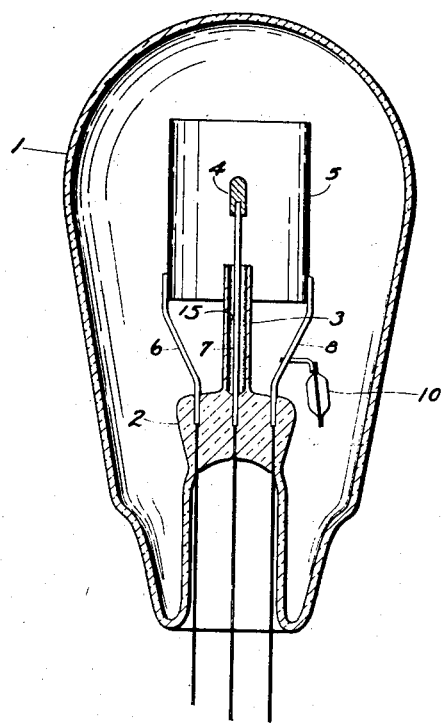
                                              INVENTOR
                                      CHARLES G. SMITH
                                         BY
                                              ATTORNEY Patented Nov. 21, 1933

1,935,894

UNITED STATES PATENT OFFICE 1,935,894

GASEOUS DISCHARGE DEVICE

Charles G. Smith, Medford, Mass., assignor, by mesne assignments, to Raytheon Manufacturing Company, Newton, Mass., a corporation of Delaware Application March 25, 1929. Serial No. 349,828

4 Claims. (Cl. 250—27.5)

This invention relates to gaseous discharge devices and particularly to the stems thereof. In many devices such as rectifiers, photo-electric cells and the like, vapors of metals are often used. Such devices as a rule have their electrodes supported by wires sealed in a glass press. Trouble has been experienced by the condensation of the metallic vapors along the surface of the glass and the formation of a conducting bridge across the wires. This effect has been especially noticeable in the case of photo-electric cells. Such cells as a rule have an extremely minute current output. The presence of a conducting bridge between the various leads in such cells is especially troublesome since the leakage current is comparable to the entire output of the cell.

Even if photo-electric cells do not have the opposing wires sealed in the same press, the same thing is likely to occur by the formation of a conducting bridge between the edge of the active photo-electric cathode layer and the anode lead. In such cells as a rule relatively highly volatile metals such as cæsium and rubidium are frequently used. Even at room temperature such metals have an appreciable vapor pressure.

An object of my invention is to devise a structure in which the possibility of the formation of a conducting film between oppositely charge wires is eliminated. A further object is to make such a structure simple and efficient.

Referring to the drawing, the single figure shows a gaseous discharge device embodying my invention. The tube consists of a glass envelope 1 having a reentrant stem terminating in a pinch or press 2. Electrodes 4 and 5 are supported by wires 6, 7 and 8 sealed in press 2. A capsule 10 welded to one of the supporting wires contains chemicals which upon heating evolve the desired metallic vapors. In order to prevent the condensation and deposition of metallic vapors between the wires along the surface of glass, I preferably melt a piece of glass tubing 3 around any one or all of the wires at the press. This tubing is but slightly larger than the wire and has its walls spaced therefrom. Within the tubing, I dispose some suitable substance 15 which is capable of reacting with the metallic vapors present and form an insulating compound. Thus lead peroxide or any other oxidizing compound may be used. Obviously metal vapors condensed upon the surface of the electrode 5 results in the coating of this electrode with the thermionically active metal, which condensed metal surface serves as one electrode.

By making the clearance between the wire and the inside of tube 3 as small as possible, the flow of vapor therein is greatly impeded. What little vapor does get in is condensed on the inner surface of tube 3 near the entrance and interacting with the compound there, is transformed into a harmless oxide. In actual practice, and at the temperatures at which electron discharge devices are operated, the amount of metallic vapor flowing into a small tube 3 is negligible and would not deplete the supply any appreciable amount. A small amount of compound such as lead peroxide within tube 3 is ample for the life of an ordinary tube.

Since passage and consequent condensation of metallic vapor very deep into tube 3 is impossible, it is evident that there will be a considerable length of surface between the seal along the inside of glass tube 3 which will always remain free of any metallic deposits.

It is of course evident that any number of wires may be surrounded by such tubes. My invention is applicable to all kinds and types of electrical discharge apparatus in which undesirable metallic condensation may form a high resistance bridge across opposing electrodes. My invention is especially applicable to thermionic tubes and photo-electric cells which because of their great sensitivity are very likely to be noisy and erratic because of leakage between electrodes along the surface of the container.

I claim:

1. In a vapor conduction device, a press, wires sealed in said press, at least one of said wires having an insulating member surrounding a portion of said wire and spaced therefrom, and means on the interior surface of said member and also spaced from said wire for reacting with vapors to render them non-conducting.

2. An electron discharge device comprising a sealed container having a condensed metal vapor electrode, a lead-in wire therefor, another electrode supported by a lead-in wire, said lead-in wires being sealed in the said container, the lead-in wire for the said other electrode having an insulating tube surrounding a portion of the said lead-in wire and spaced therefrom, and means on the interior surface of said tube and also spaced from said wire for reacting with vapors to render them non-conducting.

3. An electron discharge device comprising a sealed container having a metallic vapor therein, electrodes within said container, conductors connected to said electrodes and sealed in said container, a tubular member surrounding at least one of said conductors from the point at which it is sealed in said container to a point within said container, said tubular member being spaced from said conductor, and means on the interior surface of said tubular member and also spaced from said conductor for reacting with said vapor to render it non-conducting in order to prevent the formation of a conducting film of said vapor about said conductor.

4. An electron discharge device comprising a sealed container having a metallic vapor therein, electrodes within said container, conductors connected to said electrodes and sealed in said container, means providing a restricted space around at least one of said conductors extending from the interior of said container to the point at which said conductor is sealed in said container, and means deposited on said first named means distributed along the length of said space and spaced from said conductor for reacting with said vapor to render it non-conducting in order to prevent the formation of a conducting film of said vapor about said conductor.

CHARLES G. SMITH.